July 26, 1938.   W. M. HALIBURTON ET AL   2,124,917
CONTROL APPARATUS FOR MOTION PICTURE PROJECTORS
Filed July 9, 1936   3 Sheets-Sheet 3

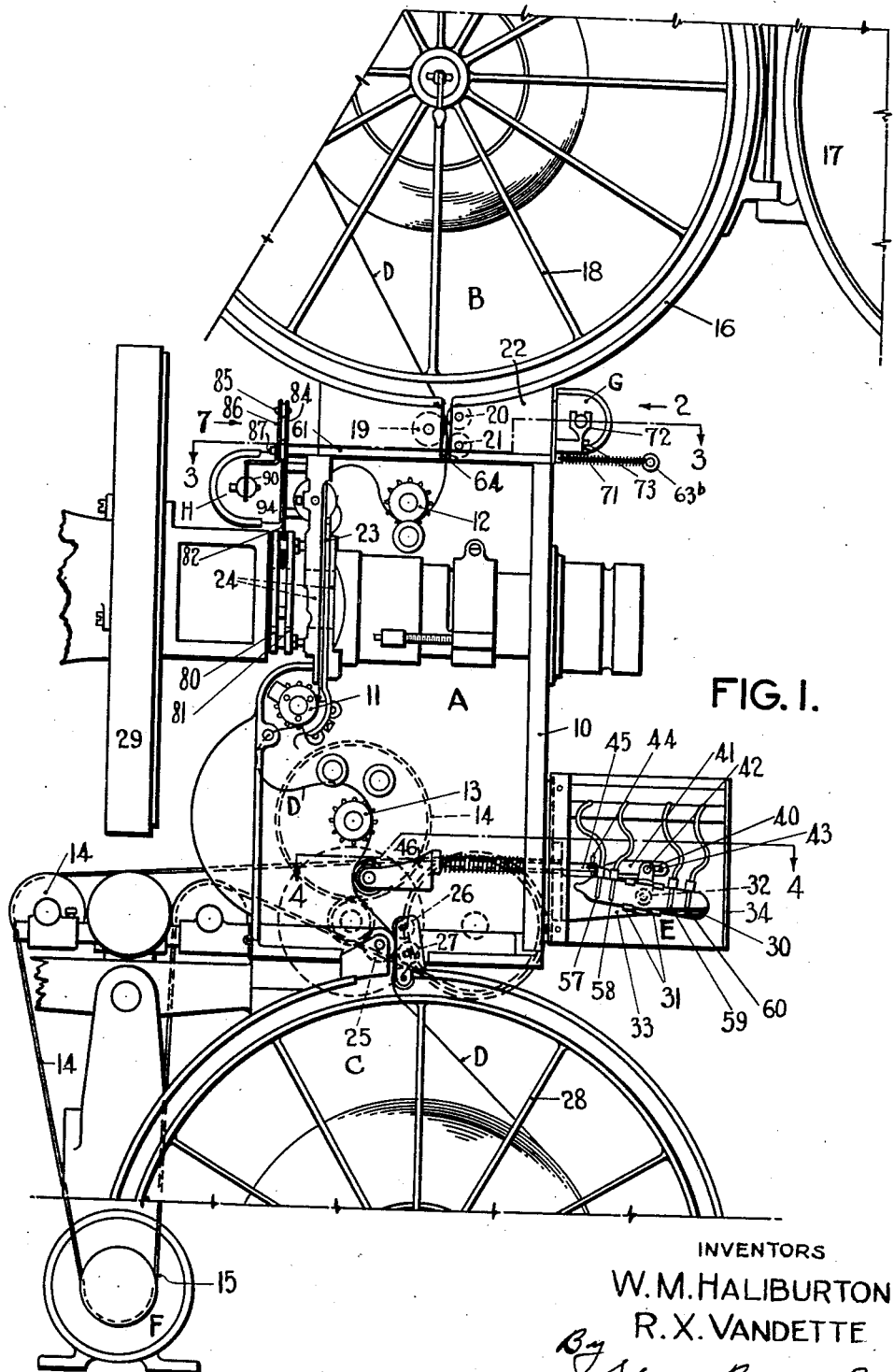
FIG. I.
INVENTORS
W. M. HALIBURTON,
R. X. VANDETTE
By Stone, Boyden & Mash
ATTORNEYS.

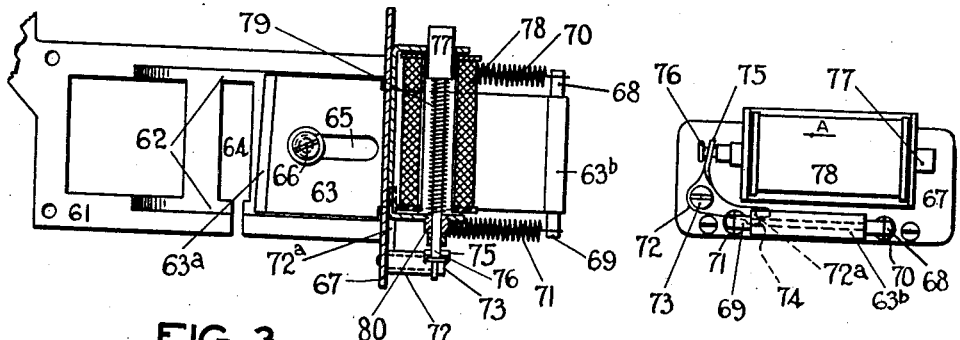
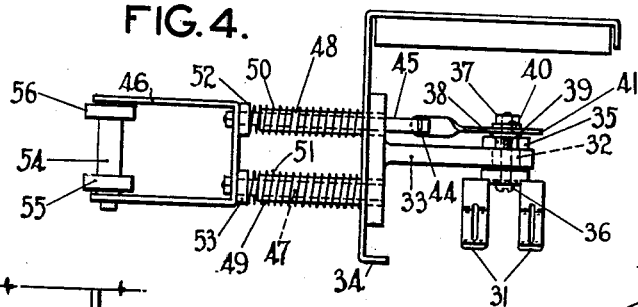

INVENTORS.
W. M. HALIBURTON.
R. X. VANDETTE.
By Stone, Boyden & Mack
ATTORNEYS.

UNITED STATES PATENT OFFICE 2,124,917

CONTROL APPARATUS FOR MOTION PICTURE PROJECTORS

William Mordaunt Haliburton, Montreal West, and Romeo Xavier Vandette, Dorval, Quebec, Canada Application July 9, 1936, Serial No. 89,826

5 Claims. (Cl. 88—17)

Our present invention appertains generally to the art of motion picture projectors and has to do in particular with instrumentalities for controlling passage of film through the projector head.

In its preferred embodiment the invention includes a plurality of units attachable to practically any type of standard motion picture projector now in use, and comprises control instrumentalities which combinatively serve to govern operation of the film motivating gear and the film gate aperture shutter upon breakage of the film, and simultaneously effect severing of the film and sealing and locking of the magazine from which the film is fed. While the invention includes the combined means above mentioned, we wish it to be understood that we consider the aforesaid means not only combinatively novel, but according to the prior art, certain of the co-ordinated devices are new in less combinations than the whole and are capable of independent use, as hereinafter explained in detail.

To elucidate the novel aspects, objects and advantages of the invention, we shall first refer briefly to the structural characteristics and the manner of operation of well known types of motion picture projectors. Standard type machines usually embody a film reel magazine from which film is rapidly withdrawn in successive steps by film motivating gear housed within the projector head, which unit is usually located beneath the aforesaid film reel magazine. In its passage from the first said unit to the other, the film passes through a narrow aperture and between co-acting rollers, which are provided to snuff out film combustion, but this device has proven to be wholly inadequate in this respect. After the film leaves the aforesaid rollers, it is advanced across the film gate, which is apertured for transmission of light from the projector lamp. At this point, pressure plates are used to restrain the film in its proper path of travel and these plates, together with associated parts, are subject to the intense heat emitted from the projector lamp.

In the standard motion picture projector, film is fed across the film gate aperture at a net velocity of approximately ninety feet per minute and while thus in motion it will not ignite although subject to the intense heat emitted by the projector lamp. By exhaustive tests we have proven conclusively that in the event of cessation of film substantially only one frame of the film will burn, the flame will not travel from between the pressure plates, and a conflagration in the projector head extraneous of the film pressure plate cavity can only be caused by piling up of film in the upper portion of the projector head and coming in contact with intensely hot metal parts.

Regardless of the diligence of operators, a great deal of damage is done to film and projector head mechanism, due to film combustion or pile up, which is usually caused by poorly patched or improperly joined film sections. In passage through the film pressure plates, such parts of the film drag and impose excessive load upon the feed sprockets and the latter tear the film, with resultant interruption of film travel and contact of loose film with hot metal parts. Although the operator may respond quickly to the image of fire projected upon the screen and switch off the powering motor, due to time lag and the momentum of the film motivating gear, film will continue to feed throughout the succeeding twenty-five to fifty seconds, during which time film is continuously fed into the projector head where it is destroyed by combustion or causes serious damage to the precise and fragile film motivating mechanism.

Heretofore, motion picture projectors have been provided with film feed control apparatus which responds to conflagration within the projector head and functions to terminate feeding of the burning film. In contra-distinction to the foregoing, our apparatus is designed to prevent film combustion. It operates simultaneously with tearing or breakage of film and in such wise that only a very short piece of film can be destroyed, without impairment of the projector head mechanism.

In greater detail, the primary object of our invention is to provide control instrumentalities arranged to govern transmission of film from the film reel magazine and through the projector head in such manner as to eliminate the possibility of film conflagration.

More specifically, the invention resides in the co-relation with film motivating mechanism including a prime mover, of means controlled by the film and operable upon film breakage to govern operation of said prime mover; the provision of a device arranged to sever film at the point of egress from the film reel magazine and to form a closure between the film reel magazine and the projector head, said device being governed by means controlled by the film and operable upon film breakage; the provision of a locking device for the film reel magazine door, said locking device being governed by means controlled by the film and operable upon film breakage; and the provision of closure means for the film gate aperture, said closure means being governed by means controlled by the film and operable upon film breakage.

Our invention resides in the novel construction, combination and arrangement of instrumentalities substantially as hereinafter described and more particularly as defined by the appended claims, it being understood that such changes in the precise embodiment of the herein disclosed invention may be made as come within the scope of the claims.

In the accompanying drawings, we have illustrated an example of the physical embodiment of the invention constructed according to the best design we have so far established for practical application of the principles thereof, and in which:

Fig. 1 is a partial side elevation of a projector film feeding mechanism, mechanism protecting housing and film reel magazines, illustrating the application of our invention thereto;

Fig. 2 is an elevation, looking in the direction of arrow 2, showing the film severing knife and control means therefor;

Fig. 3 is a sectional plan view of the film severing knife and its control means, the view being taken on line 3—3 of Fig. 1;

Fig. 4 is a plan view, as it would appear when looking in the direction of the plane 4—4, showing the electric circuit contactor governing means;

Fig. 5 is a partial elevation, showing a portion of the upper film reel magazine, its door, and locking means therefor;

Fig. 6 is a partial side view of apparatus shown in Fig. 5;

*General construction*

Figure 7:
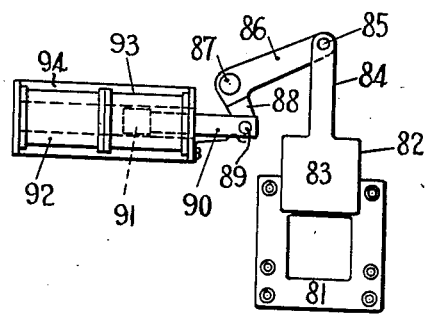
Fig. 7 is an elevation of the film gate aperture shutter and control means therefor, as viewed in the direction of arrow 7 appearing in Fig. 1.

Referring now more particularly to the accompanying drawings, in which like reference characters designate similar parts throughout the several views, for ease of explanation the various interdependent instrumentalities are first designated in their entirety by character references, being later explained in detailed analysis. Referring first to Fig. 1, A designates a projector head, B the upper film reel magazine, C the lower film reel magazine, D the film, E the film governed circuit contactor, F the film motivating gear powering motor, G the film severing device, H the film gate aperture closure means and I the film reel magazine locking device.

Those skilled in the art will understand that the aforesaid units designated by the character references A, B, C, D, F and H are at present components of standard motion picture projectors and that instrumentalities E, G and I represent added units which co-act with the aforesaid apparatus. While we have not illustrated the application of our invention to a motion picture projector equipped with sound reproducing means, we wish it to be understood that our invention can be readily applied to equipment of this character and in particular that the film governed circuit contactor E does not in any manner effect proper reproduction of sound.

The projector head A includes the housing 10, the door of which is removed for purposes of clarity, which housing forms supporting structure for the film motivating gear. It is shown as being of standard design, the principal components of which include the intermittent feed sprocket 11 and the constant feed sprockets 12 and 13, which sprockets are driven by gear generally designated by the reference character 14, said gear being actuated by the belt-drive 15 powered by the electric motor F. To avoid ambiguity and generally to facilitate reading of the drawings, we have simply shown the driving connections for transmitting power from the electric motor F to the constant feed sprocket 13, and for a proper understanding of the invention it is to be assumed that the other constant feed sprocket 12 and the intermittent feed sprocket 11 are coordinated by gearing, as in standard projector heads.

Film reel magazine B includes the housing 16 equipped with a hinged door 17. A film reel 18 is rotatably mounted within said housing and supports the film D wound upon said reel. The film D passes between the valve rollers 19, 20 and 21, through the base 22 of the housing 16 into the projector head A, is trained around constant feed sprocket 12, is looped upwardly and then extends downwardly between the pressure plates generally designated at 23, past the film gate aperture 24, is trained around the intermittent feed sprocket 11, is looped laterally substantially in the form of an S curve, is trained around constant feed sprocket 13, extends downwardly between the valve rollers 25, 26 and 27, and passes therefrom and is wound about the film reel 28, rotatably mounted within the lower film reel magazine C. It will of course be appreciated that the film D is looped as illustrated and described to compensate for the intermittent movement given the film in its passage between the aforesaid pressure plates and permitting the constant rotation of the film reels 18 and 28. Laterally of the projector head casing 10 there is depicted part of the occulting shutter mechanism casing, generally indicated by the numeral 29, through which light travels from the projector lamp, not shown.

*Film governed circuit contactor*

Device E, which governs the operation of units F, G, H and I, and is in turn governed by the film D, includes a mercury tube contactor 30, which is supported by the clips 31 fixed to the pin 32 rotatably mounted in the bracket 33. The latter component is stationary on the angle plate 34 which forms part of a protective enclosure for said contactor. Angle plate 34 is mounted on the right hand side of the projector housing 10. A collar 35 is adjustably secured to the pin 32 by the screw 36 and the nut 37 and said collar is partially circumferentially recessed as at 38 to receive the stop pin 39 extending from the bracket 33. By loosening the nut 37 upon screw 36, the pin 32 may be axially adjusted with respect to the collar 35. Thus the contactor 30 may be adjusted to accommodate any desired setting of the projector unit. When the screw 36 and the nut 37 are drawn together tightly, regardless of the angular disposition of the projector unit, the stop pin 39 will serve to govern the amplitude of motion of the said contactor. Arm 40 is immovably secured between one end of the collar 35 and the nut 37. The upper end of the said arm is vertically bifurcated to receive the link 41, which is articulated thereto by the pin 42 extending through the elongated aperture 43 in the said link. The other end of said link is articulated by pin 44 to the guide pin 45 which is fastened at its opposite end to the yoke 46. A second guide pin 47 is fastened to said yoke in parallelism with the aforesaid guide pin, and both the said pins are free to slide within the guide tubes 48—49 fixed with respect to and extending through the bracket 33. Coil springs 50—51 are supported upon the said guide tubes, abut the angle plate 34 and are retained in the cages 52—53 at the opposite ends thereof. A pin 54 extends between the sides of the yoke 46 and supports the ball rollers 55—56 which contact the film D.

The contactor 39 is of standard design and consists of a sealed glass tube containing a pool of mercury. Four terminals, 57, 58, 59 and 60 extend into the said tube and contact with the mercury within the said contactor, for the purposes hereinafter set forth.

During normal film travel, the rollers 55—56 bear against the film D under tension of the springs 50—51, as shown in Fig. 1, and the mercury within the contactor 39 bridges the contactor terminals 59 and 60. While in this position, the elongated aperture 43 in the link 41 permits slight back and forth movement of the yoke 46, without disturbing the contactor 39. Such motion is caused by the velocity of travel of the film D and irregularities therein.

Upon accidental breakage of the film D, which break usually occurs in the region of the pressure plates 23 or at the feed sprockets, film tension is relieved in the vicinity of the constant feed sprocket 13, and the springs 50—51 urge the yoke 46 to the left. Such motion causes the link 41 to likewise move laterally and in turn tilt the left end of the contactor 39 downwardly, thereby causing the mercury to flow to the left.

*Film shearing device*

The film shearing device G is located at the upper extremity of the projector head, as depicted in Fig. 1. As best shown in Figs. 2 and 3, it includes a knife guide plate 61 which is secured between the projector head housing 10 and the base 22 of the film reel magazine housing 16. The upper face of said knife guide plate is recessed as at 62 to form a guide for the film severing knife 63. The knife guide plate 61 is apertured at 64 for passage of the film D into the projector head A. The knife 63 is provided with an elongated aperture 65 through which a retaining screw 66 extends into the knife guide plate 61. End 63a of the said knife is bevelled and is provided with a sharp shearing edge. A mounting plate 67 is secured to one end of the knife guide plate 61 and said knife extends through or past this plate and the end 63b thereof is formed for easy gripping by the operator, to facilitate setting. Pins 68—69 extend laterally from the end 63b of said knife and retractile coil springs 70—71 are fastened to said pins and at their opposite ends to lugs (not shown) struck up from the plate 67. The function of the springs 70—71 is to urge the knife 63 across the film aperture 64.

Detent 72 serves to hold the knife 63 in the position show in Figs. 1 and 3, when the film D is advancing in a normal manner through the projector head. The said detent is pivoted upon the stationary stud screw 73 extending from the plate 67, and includes a finger 72a the end of which rests in a notch 74 in the knife 63, and a yoke arm 75 which straddles the pin 76 of the armature 77 disposed within the solenoid coil 78. A coil spring 79 is mounted upon the pin 76 between the pin bushing 80 and the said armature. The said spring serves to urge the pin 76 endwise, which in turn restrains the detent finger 72a in the notch 74 in the knife 63.

In Figs. 2 and 3 the film severing knife 63 is disposed in the position occupied thereby when the film D is feeding normally. As later explained, the coil 78 is arranged in an electric circuit governed by the contactor 39 of device E and upon tilting of said contactor due to breakage of the film D, the coil 78 is electrically energized. Energization of said coil causes the armature 77 to shift endwise in the direction of arrow A, Fig. 2. The detent 72 is in turn rocked upon its pivot stud 73 and the detent finger 72a is released from the notch 74 in the knife 63, thereby releasing said knife which is rapidly advanced by the retractile coil springs 70—71 across the film aperture 64.

*Film gate aperture closure means*

Standard motion picture projectors are at the present time usually equipped with what are known in the trade as "change over shutters". This device, designated in its entirely by H in Fig. 1, consists essentially of a film gate aperture shutter governed by electro-mechanical means which are ordinarily manually operated upon film "change over" from one projector to another. Our invention comprehends the co-ordination of such a device with the above described film severing means G and the film governed control unit E, in such manner that upon occurrence of film breakage, the shutter of such device is shifted to form a closure for the film gate aperture and thus shield film D from the intense heat emitted from the projector lamp.

Referring again to Fig. 1, the numerals 80—81 designate spaced apertured plates of non-metallic heat resisting material, arranged in close proximity to the film gate aperture 24. These plates form a guide for the shutter 82, which consists of a plate 83 of sufficient area to preclude transmission of the light beam emitted from the projector lamp, and an integral arm 84 which extends upwardly and is pivoted by the pin 85 to the bellcrank lever 86. The latter is hinged upon a stud pin 87 fast with the plate 61 and has a depending arm 88 which is articulated by pin 89 to the end of the pin 90 fixed to the armature 91. The said armature is disposed, depending upon its operative relation with the said shutter 82, within either of the solenoid coils 92—93, which are mounted upon the bracket 94 and which in turn is secured to the projector head housing 10.

The manner of operation of the film gate aperture closure means above described is hereinafter set forth.

*Film reel magazine locking device*

A further safety feature is provided in the form of a locking device for the door of the film reel magazine B and it functions in such manner that the said door is locked automatically upon occurrence of film breakage.

This device is depicted in Figs. 5 and 6 in which there is shown a portion of the film reel magazine housing 16 and a portion of the door 17 which forms a closure for the said housing. A spring tensioned releasable latch 95 is disposed partially within the latch shield 96 mounted on the side of the housing 16, and said latch is provided with a tapered end which yields laterally under spring tension when the door is closed against it, then snaps back into door locking position. The auxiliary device consists of a detent for locking said latch, which detent is generally indicated by the numeral 97. It is pivoted at 98 to the bracket 99 mounted on the housing 16, and has a depending finger 100 which fits between the latch 95 and the latch shield 96. From the opposite end of said detent there extends a pin 101 which is engaged in a slot 102 in the armature 103, which in turn is governed by the solenoid coil 104 into which it extends. The said solenoid coil is supported upon the yoke strap 105 fixed to the bracket 99.

As is hereinafter explained in greater detail, in the event of film breakage and resultant adjustment of the contactor 30 of device E an electric circuit for the coil 104 is established. Upon electrical energization of the said coil, the armature 103 is drawn upwardly and the finger 100 is in turn lowered and disposed in latch restraining position, as depicted in Figs. 5 and 6. While the projector mechanism is operating normally, the coil 104 is not electrically energized and the finger 100 of the detent 97 is held above the aforesaid latch device by the counter-balancing effect of the armature 103.

Unit co-ordinating electric circuits

Figure 8:
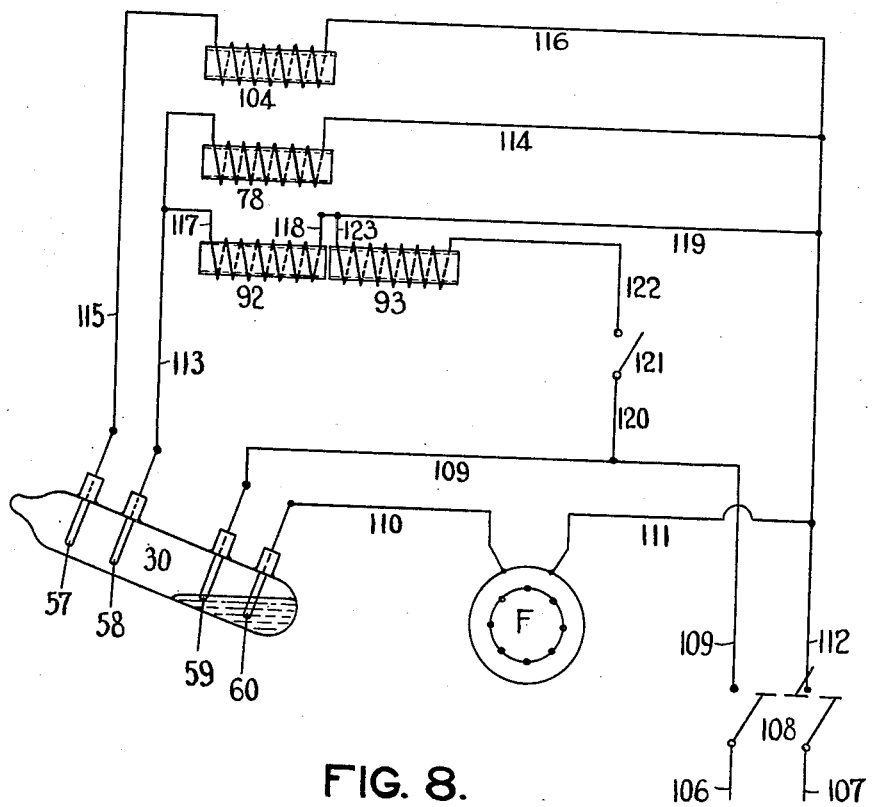
Fig. 8 is a diagram showing the electric circuits of the various electro-mechanical instrumentalities which constitute the present embodiment of our invention.

Referring now to Fig. 8, the supply mains are designated by the numerals 106 and 107, being manually governed by the switch 108. The circuit for the motor F includes conductor 109, the contactor terminal 59, the mercury pool within the said contactor, the contactor terminal 60 and the conductors 110 and 111, the latter connecting to conductor 112. The circuit for the coil 78 of unit G includes the conductor 109, the terminals 58 and 59 of the contactor 30 and the mercury pool therein, the conductor 113, the coil 78 and the conductor 114 which connects to conductor 112. The circuit for coil 104 of unit I includes the conductor 109, the contactor terminals 59 and 57 of the contactor 30 and the mercury pool therein, the conductor 115, the coil 104 and the conductor 116 which connects to conductor 112. The circuit for coil 92 includes conductor 109, the terminals 59 and 58 of the contactor 30 and the mercury pool therein, the conductors 113 and 117, the coil 92, the conductors 118 and 119, the latter being connected to the conductor 112. The circuit for the coil 93 includes the conductor 109, conductor 120, the "change over" switch 121, the conductor 122, the coil 93 and the conductor 123 which is connected to conductor 119, itself connecting conductor 112.

General operation

Let it be assumed that the switch 108 is closed, that the motor F is electrically energized and that the film motivating gear including the sprockets 11, 12 and 13 are functioning and that the film D is being motivated in a normal manner through the projector head. Accordingly the rollers 55—56 of unit E are being urged under light pressure exerted by the springs 50—51, against the film D and the contactor 30 is disposed as illustrated, with the mercury pool therein bridging the terminals 59 and 60. The knife 63 of unit G is positioned as shown in Fig. 3, being restrained by the detent 72 engaged therewith. Shutter 82 of unit H is disposed, as illustrated, in elevated position, allowing projection of light through the film gate aperture 24. Detent 97 of unit I is retained in elevated position clear of the latch 95, thereby permitting access to the film reel magazine B to examine the condition of the film D wound upon the film reel 18.

Presume that the film breaks due to heat or mechanical strain. The film below the sprocket 13 upon occurrence of film breakage sags, thereby releasing the rollers 55—56, which in turn are urged laterally under expansive force of springs 50—51. Through the link gear previously described, the left end of the contactor 30 is depressed and the pool of mercury therein flows from right to left. Thus the connection between terminals 59 and 60 is broken and a momentary connection between terminals 57, 58 and 59 is established. As the mercury continues to flow to the left, it leaves terminal 59.

At the moment the mercury pool in the contactor 30 clears the terminal 60, the circuit for the motor F is broken and the motor and in turn the film motivating gear comes to rest. At the instant the mercury pool in contactor 30 bridges the terminals 58 and 59, the coil 78 of unit G is energized, the armature 77 is magnetically urged laterally, the detent 72 is rocked about pin 73, and the detent finger 72a is disengaged from the notch 74 in the knife 63. The springs 70 and 71 then contract and the said knife is rapidly advanced across the aperture 64, thereby severing the film D, and sealing the aperture 64 which intercommunicates the film reel magazine B with the projector head A.

Continued flow of the mercury pool within the contactor 30 to terminal 57 establishes the electric circuit for the coil 92 and due to magnetic influence, the armature 91 is drawn laterally into the said coil. Thus the bellcrank 86 is rocked about its pivot stud 87 and the shutter 82 is lowered into position where it forms a light passage closure for the film gate aperture 24. Simultaneously coil 104 is electrically energized and due to magnetic influence the armature 103 is elevated and in turn the detent 97 is lowered whereby the finger 100 thereof is disposed between the latch 95 and the latch guard 96, thereby restraining manual release of said latch.

At the moment the mercury pool within the contactor 30 leaves the contactor terminal 59, the electric circuits for the coils 78, 92 and 104 are broken.

In order to facilitate comprehension of the novel aspects, attributes and commercial advantages of this invention, it is deemed advisable to dwell at some length upon certain factors which militate against satisfactory operation of standard type motion picture projectors.

It frequently happens that a poorly cemented patch or kinked film when passing between the film pressure plates catches and as a result sufficient strain is imposed upon the film to cause a break. The frame of film in the light beam, upon cessation of film motion for a very short period, will burn out and this usually results in film break. Further trouble may or may not be caused, depending upon the efficacy of the pressure plates in snuffing out film combustion. With the film being fed into the projector head at a velocity of ninety feet per minute, it takes but a few moments to jam the film motivating gear. Fifteen feet of film is usually ample to cause a jam. It may be several seconds before the projector operator appreciates that the film has been broken and even after he has turned off the powering motor film feed continues from twenty-five to fifty seconds before the motivating gear has come to rest and has ceased feeding film into the projector head. From the above it is evident that at times up to one hundred feet of film may become jammed in the projector head and this film, as a result of contact with hot metal parts in the projector head, is almost invariably ignited. With the positive gear drive of the film motivating magazine choked with film, some part has to give way, which usually results in bent arbors and stripped gears.

Film fire if limited to the projector head cavity is of serious consequence but when it spreads to the upper film reel magazine, which it readily does, through actual flame travel or by heat transference, it becomes an extremely dangerous fire, hazardous to life and property. Projector operators fully appreciate the danger of fire and upon its commencement will frequently try to limit the fire to the projector head by removing the film reel from the upper magazine. This frequently results in the film fire being spread throughout the projector booth. It is a matter of record that a fire in the upper film reel magazine is likely to force open the film reel magazine door, thus resulting in spread of the conflagration. The foregoing description of a film break developing into a serious conflagration is not exaggerated but a plain statement of facts and is the reason for picture theatres being considered hazardous as viewed by insurance and indemnity companies, and police and fire departments. In particular, projection of an image of flame onto the screen is extremely dangerous in that it may arouse sufficient fear in the minds of the audience to cause serious panic.

After showing the most frequent cause of and the progress of film fire, we will now enlarge upon the foregoing elucidation of the operation of the co-ordinative instrumentalities constituting our present invention. Let it be assumed that a defective patch on a film feeding from the film reel magazine B causes undue tension on the film or actually catches between the film pressure plates. The constant feed sprocket 13 continues to exert tractive effort on the film, the loop in the film is thereby removed, and the feed sprockets continue to pull on the film until it severs between the point of obstruction and one of the said sprockets. The film progresses until it fails to engage the teeth of the constant feed sprocket 13 and then the film tension, as it previously existed between the constant feed sprocket 13 and the lower film reel magazine, relaxes. Relaxation of the film permits the means controlling the contactor 30 of unit E to shift laterally, and the said contactor is immediately thereafter tilted. Actuation of the said contactor results in breaking of the electric circuit to the motor F, energization of the solenoid coil 78 of unit G and resultant rapid motion of the film shearing knife 63 across the film opening 64 and severing of the film D; energization of the coil 92 of unit H and resultant disposition of the shutter 82 over the film gate aperture 24; and energization of coil 104 of unit I and in turn disposition of detent 97 in film reel magazine B door latch locking position.

The aforesaid operations are performed substantially in synchronism with tilting of contactor 30, in fact so rapid is film severing operation in time sequence to film break that, despite the velocity of travel of film into the projector head, the total amount of severed film remaining in the projector head is, on standard machines, approximately eighteen inches. The change over shutter 82 of unit H acts just as promptly. This is a very important consideration because if film is allowed to stop under the pressure plates in the path of the light beam for approximately two-thirds of a second, one film frame will burn out and cause an image of fire to be projected onto the screen. The function of this change over shutter is so rapid that it forestalls this occurrence and the shutter is closed before the film has time to ignite. While this feature is not of great consequence from the viewpoint of film fire, it is of inestimable value in preventing audience panic.

At the end of every film, units E, G, H and I operate and this indicates to the operator of the projector that they are constantly ready for emergencies. The fact that the knife 63 of unit G must be reset manually and unit E must also be reset upon threading of film through the projector head, insures that these instrumentalities are at all times set and ready for operation.

The foregoing analysis will so fully reveal the gist of this invention that others can, by applying current engineering knowledge, readily adapt the same to reasonably accord with conventional motion picture projector design practice, without omitting certain features which fairly constitute essential characteristics of the generic or specific aspects of this invention and therefore all such adaptations should and are intended to be comprehended within the meaning and range of equivalency of the following claims.

We claim:—

1. In a motion picture projecting machine a film magazine equipped with a normally closed door and with a normally inoperative locking device adapted to be operated to lock the door of the magazine in closed position in case of fire, a solenoid adapted to be energized to operate said locking device to its door locking position and a switch functioning automatically, in response to breakage of the film within the projector head, to complete circuit connections for energizing said solenoid and effecting operation of said door locking device.

2. In a motion picture projecting machine a magazine equipped with a normally closed door, a normally inoperative latch adapted to be actuated to a position securing the magazine door in its closed position in case of fire, a solenoid adapted when energized to actuate said latch to a door locking position, a motor control switch included in the circuit of the film operating motor and means functioning automatically in response to breakage of the film within the projector head to operate said switch to a position disrupting the flow of current to said motor, said switch serving, in said last mentioned position, to complete circuit connections for energizing said solenoid.

3. In a motion picture projecting machine, a film magazine equipped with a normally closed door and with a normally inoperative locking device adapted to be operated to lock the door of the magazine in closed position in case of fire, operating means for said locking device including a normally deenergized electro-magnetic control element and a switch functioning automatically in response to breakage of the film within the projector head to complete circuit connections for energizing said element and effecting operation of said locking device.

4. In a motion picture projecting machine, a film magazine equipped with a normally closed door and with a normally inoperative locking device adapted to be operated to lock the door of the magazine in closed position in case of fire, a solenoid mechanically connected to said locking device to operate the latter to its door locking position when the solenoid is energized, a motor control switch included in the circuit of the film operating motor and means functioning automatically in response to breakage of the film within the projector head to operate said switch to a position disrupting the flow of current to said motor, said switch serving, in said last mentioned position, to complete circuit connections for energizing said solenoid.

5. In fire prevention apparatus for motion picture projecting machines, the combination of an upper film magazine equipped with a normally closed door and with a normally inoperative locking device adapted to be operated to lock the door of the magazine in closed position in case of fire, a cutter for severing the film close to said magazine, means normally biasing said cutter to a film cutting position, means releasably holding said cutter in a retracted position, a solenoid adapted to be energized to operate said locking device to its door locking position, a motor control switch included in the circuit of the film operating motor, means functioning automatically in response to breakage of the film within the projector head to operate said switch to a position disrupting the flow of current to said motor, said switch serving, in said last mentioned position, to complete circuit connections for energizing said solenoid and for releasing said cutter holding means to permit the cutter to move to its film cutting position under the influence of said biasing means.

WILLIAM MORDAUNT HALIBURTON.
ROMEO XAVIER VANDETTE.